United States Patent
Ladd et al.

(10) Patent No.: US 9,006,344 B2
(45) Date of Patent: Apr. 14, 2015

(54) GOLF BALLS HAVING CORES MADE OF POLYBUTADIENE RUBBER BLENDS

(75) Inventors: Derek A. Ladd, Acushnet, MA (US); David A. Bulpett, Boston, MA (US); Michael J. Sullivan, Barrington, RI (US); Brian Comeau, Berkley, MA (US)

(73) Assignee: Acushnet Company, Fairhaven, MA (US)

( * ) Notice: Subject to any disclaimer, the term of this patent is extended or adjusted under 35 U.S.C. 154(b) by 295 days.

(21) Appl. No.: 13/539,825

(22) Filed: Jul. 2, 2012

(65) Prior Publication Data

US 2014/0004974 A1    Jan. 2, 2014

(51) Int. Cl.
*A63B 37/00*  (2006.01)
*A63B 37/04*  (2006.01)
*A63B 37/06*  (2006.01)
*C08L 9/00*    (2006.01)

(52) U.S. Cl.
CPC ............... *A63B 37/005* (2013.01); *A63B 37/04* (2013.01); *A63B 37/0065* (2013.01); *A63B 37/06* (2013.01); *A63B 37/0063* (2013.01); *C08L 9/00* (2013.01)

(58) Field of Classification Search
None
See application file for complete search history.

(56) References Cited

U.S. PATENT DOCUMENTS

| | | | |
|---|---|---|---|
| 4,683,257 A | | 7/1987 | Kakiuchi et al. |
| 4,955,613 A | | 9/1990 | Gendreau et al. |
| 5,050,886 A | * | 9/1991 | Yamagishi et al. ............ 473/372 |
| 5,082,285 A | | 1/1992 | Hamada et al. |
| 5,589,546 A | * | 12/1996 | Hiraoka et al. ............... 525/193 |
| 6,277,920 B1 | | 8/2001 | Nesbitt |
| 6,315,684 B1 | | 11/2001 | Binette et al. |
| 6,419,594 B1 | * | 7/2002 | Nesbitt et al. ................. 473/371 |
| 6,422,953 B1 | * | 7/2002 | Nesbitt et al. ................. 473/376 |
| 6,692,381 B2 | | 2/2004 | Sakagami et al. |
| 6,750,281 B2 | * | 6/2004 | Hirau et al. .................... 524/406 |
| 7,524,252 B2 | | 4/2009 | Endo et al. |
| 7,919,571 B2 | | 4/2011 | Nakagawa et al. |
| 2003/0096912 A1 | | 5/2003 | Kawasaki et al. |
| 2004/0116605 A1 | | 6/2004 | Nishihara et al. |
| 2005/0192399 A1 | * | 9/2005 | Fujisawa et al. .............. 524/571 |
| 2006/0094832 A1 | | 5/2006 | Sakagami et al. |
| 2009/0110944 A1 | | 4/2009 | Aguirre et al. |
| 2009/0124413 A1 | * | 5/2009 | Sullivan et al. ............... 473/373 |
| 2010/0022725 A1 | | 1/2010 | Thuilliez et al. |
| 2012/0100934 A1 | | 4/2012 | Sullivan et al. |

FOREIGN PATENT DOCUMENTS

EP    1086957 A1    3/2001
JP    2002338606    * 11/2002

OTHER PUBLICATIONS

Thain; Science and Golf IV; Jul. 2002; pp. 319-327.*
S. Kaita et al., "Ultimately Specific 1,4-cis Polymerization of 1,3-Butadiene with a Novel Gadolinium Ctalyst," Macomolecular Rapid Communications 24 (2003) pp. 179-184.
S. Kaita et al., "Butadiene Polymerization Catalyzed by Lanthanide Metallocene-Alkylaluminum Complexes with Cocatalysts: Metal Department Control of 1,4 Cis/Trans Stereoselectivity and Molecular Weight," Macromolecules 39 (4) (2006) pp. 1359-1363.

* cited by examiner

*Primary Examiner* — David Buttner
(74) *Attorney, Agent, or Firm* — Daniel W. Sullivan (57) ABSTRACT

Multi-piece golf balls having a core made of a composition comprising a polybutadiene rubber blend are provided. The blend includes a non-metallocene catalyzed polybutadiene rubber and a metallocene-catalyzed polybutadiene rubber. Catalysts such as neodymium, nickel, and cobalt based catalysts may be used to make the non-metallocene catalyzed rubber. Catalysts such as ferrocene, cobaltocene, nickelocene, titanocene dichloride, zirconocene dichloride, and samraocene based catalysts may be used to make the metallocene-catalyzed rubber. The golf ball may contain single layered core or multi-layered cores. The core is surrounded by a cover having at least one layer. The resulting ball has high resiliency and a soft compression feel.

13 Claims, 2 Drawing Sheets

GOLF BALLS HAVING CORES MADE OF POLYBUTADIENE RUBBER BLENDS

BACKGROUND OF THE INVENTION

1. Field of the Invention

The present invention generally relates to multi-piece golf balls and more particularly to golf balls having at least one component made of a composition comprising a polybutadiene rubber blend. The blend includes a non-metallocene catalyzed polybutadiene rubber and a metallocene-catalyzed polybutadiene rubber. The golf ball may contain a single layered core or multi-layered core. The golf ball further includes a cover having at least one layer.

2. Brief Review of the Related Art

Today, professional and amateur golfers normally use multi-piece, solid golf balls primarily because of their playing performance properties. Such balls typically include an inner core made of a natural or synthetic rubber such as polybutadiene, styrene butadiene, or polyisoprene. The ball further includes a cover that surrounds the inner core and provides impact-durability, mechanical strength, hardness, and cut/tear-resistance to the ball. The outer cover may be made from a variety of materials including ionomer ethylene acid copolymers, polyamides, polyesters, polyurethanes, and polyureas. The ball may further include one or more intermediate layers disposed between the inner core and outer cover that may be modified to provide certain properties.

Manufacturers of golf balls use different materials to impart specific properties and features to the ball. For example, the resiliency and rebounding performance of the golf ball is based primarily on the core. The core acts as an engine for the ball. In general, the rebounding performance of the ball is based on its initial velocity after being struck by the face of the golf club and its outgoing velocity after making impact with a hard surface. More particularly, the "coefficient of restitution" or "COR" of a golf ball refers to the ratio of a ball's rebound velocity to its initial incoming velocity when the ball is fired out of an air cannon into a rigid vertical plate. The COR for a golf ball is written as a decimal value between zero and one. A golf ball may have different COR values at different initial velocities. The United States Golf Association (USGA) sets limits on the initial velocity of the ball so one objective of golf ball manufacturers is to maximize COR under these conditions. Balls with a higher rebound velocity have a higher COR value. Such golf balls rebound faster, retain more total energy when struck with a club, and have longer flight distance.

Golf balls containing cores made of polybutadiene rubber compositions are generally known in the art. For example, Kakiuchi et al., U.S. Pat. No. 4,683,257 discloses a polybutadiene rubber composition comprising; i) a polybutadiene blend; ii) an unsaturated carboxylic acid and/or a salt thereof capable of producing crosslinking in the polybutadiene; iii) inorganic filler; and iv) organic peroxide. The polybutadiene blend includes a nickel and/or cobalt-based (non-metallocene) catalyzed polybutadiene and a lanthanide rare earth element-base catalyzed polybutadiene.

Gendreau et al., U.S. Pat. No. 4,955,613 discloses a core made from two polybutadienes, each having a Mooney viscosity of below about 50 and a cis-1,4 content of greater than about 40%. One polybutadiene is nickel- or cobalt-catalyzed (non-metallocene), while the other is lanthanide-catalyzed (non-metallocene). The golf ball product includes a mix of the two polybutadienes, a metal salt of an unsaturated carboxylic acid, and a free radical initiator to cure the composition.

Hamada et al., U.S. Pat. No. 5,082,285 discloses a core made from a rubber composition which comprises polybutadiene rubber, a crosslinking agent, and a co-crosslinking agent, wherein the polybutadiene rubber is prepared by mixing nickel-catalyzed (non-metallocene) polybutadiene rubber and cobalt-catalyzed (non-metallocene) polybutadiene rubber together.

Nesbitt, U.S. Pat. No. 6,277,920 discloses a core formed from a polybutadiene composition comprising polybutadiene, a cross-linking agent, a metal soap, and zinc oxide, wherein the polybutadiene, prior to curing of the composition, has a polydispersity of 1.9 to 3.9 and a Mooney viscosity of greater than 70. The monomer used to form the polybutadiene is polymerized in the presence of a non-metallocene catalyst, particularly cobalt, lanthanum, nickel, aluminum, boron, lithium, or titanium-based catalyst; or combinations thereof.

Binette et al., U.S. Pat. No. 6,315,684 discloses a core comprising: (i) a first polybutadiene rubber produced using a cobalt-based (non-metallocene) catalyst having a Mooney viscosity in the range of from about 70 to about 83, and (ii) a second polybutadiene rubber produced using a lanthanide series (non-metallocene) catalyst and having a Mooney viscosity of from about 30 to about 70.

Endo, U.S. Pat. No. 7,524,252 discloses a one-piece golf ball made from a polybutadiene rubber composition, wherein the composition contains 100% (parts based on total rubber) metallocene-catalyzed polybutadiene rubber. Thus, the metallocene-catalyzed polybutadiene is molded into one spherical piece to form the ball. In general, one-piece balls have several disadvantageous properties versus multi-piece golf balls including inferior playability, spin control, and flight control; and the ball tends to travel a shorter distance using driver and iron clubs. Also such one-piece balls have generally poor weatherability (they do not maintain their playing properties in hot and cold weather and have a short shelf-life and poor moisture-resistance). One-piece balls also generally have poor impact-durability; hardness, and toughness.

Sullivan, US Patent Application Publication 2012/0100934 discloses a core formed from a blend comprising a linear polybutadiene formed with a neodymium-based (non-metallocene) catalyst having a first Mooney viscosity of 30 to 100; and a branched polybutadiene formed with a neodymium-based (non-metallocene) catalyst having a second Mooney viscosity of 20 to 90. Both the linear and branched Nd-BR rubbers preferably have a cis-1,4 content of at least about 95 percent. The blend may optionally contain cobalt, lithium, titanium, or nickel catalyzed polybutadienes.

Although some conventional polybutadiene rubber compositions used to form golf ball cores today have generally good properties, there is still a need for improved polybutadiene rubber compositions. These compositions should be generally easy to manufacture, have low material costs, and provide the finished golf ball with optimum playing performance properties. Particularly, the polybutadiene rubber composition should be capable of providing a core having high resiliency so that a player can drive the ball long distances. The core material also should have good durability and toughness. The present invention provides such core compositions and resulting golf balls having these properties as well as other advantageous characteristics, features, and benefits.

SUMMARY OF THE INVENTION

The present invention relates to a golf ball comprising an inner core and a cover having at least one layer disposed about the core. The inner core comprises i) about 50% to about 95% by weight of a non-metallocene catalyzed polybutadiene rubber; and ii) about 5 to about 50% by weight of a metallocene-catalyzed polybutadiene rubber. The center of the inner core and outer surface of the inner core layer each has a hardness and preferably the outer surface hardness of the inner core is greater than the center hardness of the inner core. In addition, it is preferred that the Mooney viscosity of the non-metallocene catalyzed polybutadiene rubber (first Mooney Viscosity) is less than the Mooney viscosity of the metallocene catalyzed polybutadiene rubber (second Mooney Viscosity). In one embodiment, the non-metallocene catalyzed polybutadiene rubber has a Mooney viscosity in the range of 40 to 75; and the metallocene catalyzed polybutadiene rubber has a Mooney viscosity in the range of 30 to 130.

Suitable examples of non-metallocene catalysts that can be used to catalyze the polybutadiene rubber include catalysts selected from the group consisting of neodymium, nickel, cobalt, titanium, aluminum, boron, and alkylithium-based catalysts, and combinations thereof. These non-metallocene catalysts may be referred to as Ziegler-Natta catalysts. Some examples of metallocene catalysts are complexes based on metals such as cobalt, gadolinium, iron, lanthanum, neodymium, nickel, praseodymium, samarium, titanium, vanadium, zirconium; and combinations thereof.

In another embodiment, the golf ball comprises a dual-core having an inner core and outer core layer; along with a cover having at least one layer disposed about the dual-core. The inner core has an outer surface and geometric center and the outer core layer has an outer surface and inner surface. The center of the inner core and surface of the outer core layer each has a hardness, and the surface hardness of the outer core layer is greater than the center hardness of the inner core. Preferably, the inner core comprises i) about 50% to about 95% by weight of a non-metallocene catalyzed polybutadiene rubber; and ii) about 5 to about 50% by weight of a metallocene-catalyzed polybutadiene rubber. And, preferably, the outer core layer comprises metallocene-catalyzed polybutadiene rubber with no metallocene-catalyzed polybutadiene rubber being present in the outer core layer.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

DETAILED DESCRIPTION OF THE INVENTION

The present invention relates generally to golf balls containing at least one component made from a composition comprising a blend of polybutadiene rubber. The blend includes a non-metallocene-catalyzed polybutadiene rubber and a metallocene-catalyzed polybutadiene rubber.

Golf balls having various constructions may be made in accordance with this invention. For example, golf balls having two-piece, three-piece, four-piece, and five-piece constructions may be made. The golf balls may contain core and covers having single or multiple layers. The term, "layer" as used herein means generally any spherical portion of the golf ball. More particularly, in one version, a two-piece golf ball having an inner core and cover is made. In another version, a three-piece golf ball having a dual-core (comprising an inner core and outer core layer) and a cover is made. In another embodiment, a four-piece golf ball comprising a dual-core and dual-cover comprising an inner cover and outer cover is made. In yet another construction, a five-piece golf ball having a dual-core, intermediate layer, and dual-cover is made. As used herein, the term, "intermediate layer" means a layer of the ball disposed between the core and cover. The intermediate layer may be considered an outer core layer, or inner cover layer, or any other layer disposed between the inner core and outer cover of the ball. The intermediate layer also may be referred to as a casing or mantle layer. In accordance with the present invention, at least one of the core, intermediate, and cover layers of the golf ball is formed from the rubber composition of this invention. The diameter and thickness of the different layers along with properties such as hardness and compression may vary depending upon the construction and desired playing performance properties of the golf ball.

Non-Metallocene Catalyzed Polybutadiene Rubber

The composition of this invention comprises a polybutadiene rubber material. In general, polybutadiene is a homopolymer of 1,3-butadiene. Catalysts are used to accelerate the polymerization reaction by lowering the activation temperature of the reaction. The catalysts help form a polybutadiene polymer having a desired molecular weight and microstructure. In one embodiment, a non-metallocene (Ziegler-Natta) catalyst is used to synthesize the polybutadiene rubber. For example, the non-metallocene catalyst complex may be based on a metal such as, for example, neodymium, nickel, cobalt, or titanium, and combinations thereof. Other non-metallocene based catalysts include, but are not limited to, catalysts based on gadolinium, iron, lanthanum, praseodymium, samarium, titanium, vandadium, zirconium, and combintations thereof. Aluminum and boron co-catalysts also can be used. In other embodiments, an alkyllithium (for example, butyllithium) or "anionic" catalyst may be used.

The resulting polybutadiene polymers have different micro-structures based on the catalysts used in the polymerization process. For example, some non-metallocene catalysts, for example, cobalt, nickel, and titanium-based catalysts, are used to make polybutadiene polymers having a relatively high cis-bond and low vinyl content. In a cis-bond configuration, the main internal polymer chain of the polybutadiene appears on the same side of the carbon-carbon double bond contained in the polybutadiene backbone. Since these polybutadiene polymers have a relatively low vinyl content, their glass transition temperature (Tg) is relatively low. Polybutadiene polymers having high cis-bond content are also characterized as having high elasticity; low heat build-up; high abrasion-resistance; and high oxidation-resistance when appropriately cross-linked. Because of their elastic properties, polybutadiene polymers having a high cis-bond content are preferred for making compositions that can be used in core constructions. In the present invention, the polybutadiene preferably has a 1,4 cis-bond content of at least 40%, preferably greater than 80%, and more preferably greater than 90%.

Some non-metallocene catalysts also may be used to make polybutadiene polymers having relatively high trans-bond content. In a trans-bond configuration, the main internal polymer chain is on opposite sides of the internal carbon-carbon double bond in the polybutadiene backbone. Polybutadiene having high trans-bond content (for example, greater than 90%) is characterized as being a crystalline plastic material. These high trans polybutadiene materials are similar to balata rubber materials which were used to form golf ball covers many years ago. It also is known that alkyllithium catalysts may be used to produce polybutadiene having a cis-bond content of about 40%; a trans-bond content of about 50%; and a vinyl content of about 10%. These polybutadiene polymers have a relatively high glass transition temperature (Tg) because of their high vinyl content.

In particular, the neodymium catalysts provide the polybutadiene having high 1,4 cis-bond content and a polymer structure having a relatively low degree of branching. Because of the polymer's linear structure it has relatively high mechanical strength. On the other hand, cobalt catalysts produce polybutadiene polymers having a highly branched structure. The cobalt-catalyzed polybutadiene generally has good processability, but its mechanical strength is less than neodymium-catalyzed polybutadiene. The cis-content of titanium-catalyzed polybutadiene is slightly less than the cis-content of the neodymium and cobalt-catalyzed polybutadiene. Thus, the melting point and glass transition temperature of the titanium-catalyzed polybutadiene is slightly higher.

Metallocene-Catalyzed Polybutadiene Rubber

In general, polymers produced using single-site metallocene-based catalysts are known. These polymers have a relatively narrow molecular weight distribution and uniform molecular architecture. That is, metallocene-based catalysts provide polymers in which the order and orientation of the monomers in the polymer and the amount and type of branching in each polymer chain is essentially the same. In particular, one version of a polybutadiene rubber produced using a metallocene-based catalyst is described in Nakagawa et al., U.S. Pat. No. 7,919,571, the disclosure of which is hereby incorporated by reference, may be used in accordance with this invention. Some examples of suitable metallocene-based catalysts include ferrocene, cobaltocene, nickelocene, titanocene dichloride, zirconocene dichloride, vanadiumocene, gadolinocene, and samraocene-based catalysts, and combinations thereof. Suitable metallocene catalyst complexes include the catalysts described in S. Kaita et al., "Butadiene Polymerization Catalyzed by Lanthanide Metallocene-Alkylaluminum Complexes With Cocatalysts Metal Dependent Control of 1,4-Cis/Trans Stereoselectivity and Molecular Weight," *Macromolecules* 39 (4) (2006) pp. 1359-1363; and S. Kaita et al., "Ultimately Specific 1,4-cis Polymerization of 1,3-Butadiene With a Novel Gadolinium Catalyst," *Macromolecular Rapid Communications* 24 (2003) pp. 179-184, the disclosures of which are hereby incorporated by reference.

In one embodiment, the non-metallocene catalyzed polybutadiene has a relatively low Mooney viscosity and the metallocene catalyzed polybutadiene has a relatively high Mooney viscosity. Particularly, in one version, the non-metallocene catalyzed polybutadiene has a Mooney viscosity in the range of 30 to 75. More particularly, the Mooney viscosity may have a lower limit of 30 or 35 or 40 or 45 and an upper limit of 50 or 55 or 60 or 70 or 75. Meanwhile, in one version, the metallocene-catalyzed polybutadiene has a Mooney viscosity in the range of 30 to 130. More particularly, the Mooney viscosity may have a lower limit of 30 or 35 or 40 or 45 or 50 or 55 or 60 or 70 or 75 and an upper limit of 80 or 85 or 90 or 95 or 100 or 105 or 110 or 115 or 120 or 125 or 130. In this particular version, the Mooney viscosity of the metallocene catalyzed polybutadiene is greater than the Mooney viscosity of the non-metallocene catalyzed polybutadiene.

A "Mooney unit" is an arbitrary unit used to measure the viscosity of raw or unvulcanized rubber. In the present invention, the Mooney viscosity is measured in accordance with "Standard Test Methods for Rubber-Viscosity, Stress Relaxation, and Pre-Vulcanization Characteristics (Mooney Viscometer)" of ASTM D1646-07. In general, polybutadiene rubbers of higher molecular weight and higher Mooney viscosity have better resiliency than polybutadiene rubbers of lower molecular weight and lower Mooney viscosity. However, as the Mooney viscosity increases, the milling and processing of the polybutadiene rubber generally becomes more difficult. In the polybutadiene rubber composition of the present invention, the blends of relatively high and low Mooney viscosity polybutadiene rubbers provide a composition having good resiliency and processability.

The non-metallocene and metallocene catalyzed polybutadiene rubber blend may contain other elastomers in accordance with this invention. Other elastomers include, but are not limited to, polyisoprene, ethylene propylene rubber ("EPR"), styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

Examples of commercially available polybutadiene rubbers that can be used in accordance with this invention, include, but are not limited to, BR 01 and BR 1220, available from BST Elastomers of Bangkok, Thailand; SE BR 1220LA and SE BR1203, available from DOW Chemical Co of Midland, Mich.; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEOCIS BR 40 and BR 60, INTENE 60 AF and P30AF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 710S, KBR 710H, and KBR 750, available from Kumho Petrochemical Co., Ltd. Of Seoul, South Korea; DIENE 55NF, 70AC, and 320 AC, available from Firestone Polymers of Akron, Ohio; and PBR-Nd Group II and Group III, available from Nizhnekamskneftekhim, Inc. of Nizhnekamsk, Tartarstan Republic.

The non-metallocene-catalyzed polybutadiene is preferably used in an amount of at least 50% by weight based on total weight of polymer and is generally present in an amount of about 50% to about 95%. More particularly, the amount may be within a range having a lower limit of 50% or 55% or 60% or 65% or 70% and an upper limit of 75% or 80% or 85% or 90% or 95%. Meanwhile, the metallocene-catalyzed polybutadiene rubber is preferably used in an amount of at least about 5% by weight based on total weight of polymer and is generally present in an amount of about 5% to about 50%. More particularly, the concentration may be within a range having a lower limit of 5% or 10% or 15% or 20% and an upper limit of 25% or 30% or 35% or 40% or 45% or 50%. In one preferred version, the composition comprises 70% non-metallocene catalyzed polybutadiene and 30% metallocene-catalyzed polybutadiene. More particularly, 70% neodymium-catalyzed polybutadiene is used. In a second preferred version, the composition comprises 80% non-metallocene catalyzed (for example, neodymium) and 20% metallocene-catalyzed polybutadiene. Finally, in a third preferred version, the composition comprises 90% non-metallocene catalyzed (for example, neodymium) and 10% metallocene-catalyzed polybutadiene.

The resulting polybutadiene rubber blend has properties based on both the non-metallocene and metallocene catalyzed polybutadiene rubber. In one version, the non-metallocene catalyzed polybutadiene rubber may be cured first and then this cured rubber material may be added to metallocene catalyzed polybutadiene rubber, which is initially uncured. Then, the blended composition containing the cured and uncured rubbers is cured in a later curing process. In another version, a mixture of non-metallocene and metallocene catalyzed polybutadiene rubber material, which are both uncured initially, may be prepared; and then this blended composition containing both rubbers may be cured.

Curing of Rubber Composition

The polybutadiene rubber compositions of this invention may be cured using conventional curing processes. Suitable curing processes include, for example, peroxide-curing, sulfur-curing, high-energy radiation, and combinations thereof. Preferably, the rubber composition contains a free-radical initiator selected from organic peroxides, high energy radiation sources capable of generating free-radicals, and combinations thereof. In one preferred version, the rubber composition is peroxide-cured. Suitable organic peroxides include, but are not limited to, dicumyl peroxide; n-butyl-4,4-di(t-butylperoxy)valerate; 1,1-di(t-butylperoxy)3,3,5-trimethylcyclohexane; 2,5-dimethyl-2,5-di(t-butylperoxy)hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free-radical initiators are generally present in the rubber composition in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

The polybutadiene rubber composition may further include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates. In another particular embodiment, the agent is zinc diacrylate (ZDA). When the co-agent is zinc diacrylate and/or zinc dimethacrylate, the co-agent is typically included in the rubber composition in an amount within the range having a lower limit of 1 or 5 or 10 or 15 or 19 or 20 parts by weight per 100 parts of the total rubber, and an upper limit of 24 or 25 or 30 or 35 or 40 or 45 or 50 or 60 parts by weight per 100 parts of the total rubber.

Radical scavengers such as a halogenated organosulfur, organic disulfide, or inorganic disulfide compounds may be added to the rubber composition. These compounds also may function as "soft and fast agents." As used herein, "soft and fast agent" means any compound or a blend thereof that is capable of making a core: 1) softer (having a lower compression) at a constant "coefficient of restitution" (COR); and/or 2) faster (having a higher COR at equal compression), when compared to a core equivalently prepared without a soft and fast agent. Preferred halogenated organosulfur compounds include, but are not limited to, pentachlorothiophenol (PCTP) and salts of PCTP such as zinc pentachlorothiophenol (ZnPCTP). Using PCTP and ZnPCTP in golf ball inner cores helps produce softer and faster inner cores. The PCTP and ZnPCTP compounds help increase the resiliency and the coefficient of restitution of the core. In a particular embodiment, the soft and fast agent is selected from ZnPCTP, PCTP, ditolyl disulfide, diphenyl disulfide, dixylyl disulfide, 2-nitroresorcinol, and combinations thereof.

The polybutadiene rubber compositions also may include fillers which are added to adjust the density and/or specific gravity of the material. Suitable fillers include, but are not limited to, polymeric or mineral fillers, metal fillers, metal alloy fillers, metal oxide fillers and carbonaceous fillers. Fillers can be in the form of flakes, fibers, fibrils, or powders. Regrind, which is ground, recycled core material (for example, ground to about 30 mesh particle size), can also be used. The amount and type of fillers utilized are governed by the amount and weight of other ingredients in the golf ball, since a maximum golf ball weight of 45.93 g (1.62 ounces) has been established by the United States Golf Association (USGA).

Suitable polymeric or mineral fillers include, for example, precipitated hydrated silica, clay, talc, asbestos, glass fibers, aramid fibers, mica, calcium metasilicate, barium sulfate, zinc sulfide, lithopone, silicates, silicon carbide, diatomaceous earth, polyvinyl chloride, carbonates such as calcium carbonate and magnesium carbonate. Suitable metal fillers include titanium, tungsten, aluminum, bismuth, nickel, molybdenum, iron, lead, copper, boron, cobalt, beryllium, zinc, and tin. Suitable metal alloys include steel, brass, bronze, boron carbide whiskers, and tungsten carbide whiskers. Suitable metal oxide fillers include zinc oxide, iron oxide, aluminum oxide, titanium oxide, magnesium oxide, and zirconium oxide. Suitable particulate carbonaceous fillers include graphite, carbon black, cotton flock, natural bitumen, cellulose flock, and leather fiber. Micro balloon fillers such as glass and ceramic, and fly ash fillers can also be used.

Other additives and fillers include, but are not limited to, chemical blowing and foaming agents, optical brighteners, coloring agents, fluorescent agents, whitening agents, UV absorbers, light stabilizers, defoaming agents, processing aids, antioxidants, stabilizers, softening agents, antioxidants, antiozonants, fragrance components, plasticizers, impact modifiers, $TiO_2$, acid copolymer wax, surfactants, and fillers, such as zinc oxide, tin oxide, barium sulfate, zinc sulfate, calcium oxide, calcium carbonate, zinc carbonate, barium carbonate, tungsten, tungsten carbide, silica, lead silicate, regrind (recycled material), clay, mica, talc, nano-fillers, carbon black, glass flake, milled glass, and mixtures thereof. Suitable additives are more fully described in, for example, Rajagopalan et al., U.S. Patent Application Publication No. 2003/0225197, the entire disclosure of which is hereby incorporated herein by reference. In a particular embodiment, the total amount of additive(s) and filler(s) present in the rubber composition is 15 wt % or less, or 12 wt % or less, or 10 wt % or less, or 9 wt % or less, or 6 wt % or less, or 5 wt % or less, or 4 wt % or less, or 3 wt % or less, based on the total weight of the rubber composition. In a particular aspect of this embodiment, the rubber composition includes filler(s) selected from carbon black, nanoclays (e.g., Cloisite® and Nanofil® nanoclays, commercially available from Southern Clay Products, Inc., and Nanomax® and Nanomer® nanoclays, commercially available from Nanocor, Inc.), talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. In a particular embodiment, the rubber composition is modified with organic fiber micropulp, as disclosed, for example, in Chen, U.S. Pat. No. 7,504,448, the entire disclosure of which is hereby incorporated by reference.

Golf Ball Construction

The solid cores for the golf balls of this invention may be made using any suitable conventional technique such as, for example, compression or injection molding. Typically, the inner core is formed by compression molding a slug of the uncured or lightly cured polybutadiene rubber material into a spherical structure. The outer core, which surrounds the inner core, is formed by molding a composition over the inner core. Compression or injection molding techniques may be used. Then, the intermediate and/or cover layers are applied. Prior to this step, the core structure may be surface-treated to increase the adhesion between its outer surface and the next layer that will be applied over the core. Such surface-treatment may include mechanically or chemically-abrading the outer surface of the core. For example, the core may be subjected to corona-discharge, plasma-treatment, silane-dipping, or other treatment methods known to those in the art.

The cover layers are formed over the core or ball subassembly (the core structure and any intermediate layers disposed about the core) using a suitable technique such as, for example, compression-molding, flip-molding, injection-molding, retractable pin injection-molding, reaction injection-molding (RIM), liquid injection-molding, casting, spraying, powder-coating, vacuum-forming, flow-coating, dipping, spin-coating, and the like. Preferably, each cover layer is separately formed over the ball subassembly. For example, an ethylene acid copolymer ionomer composition may be injection-molded to produce half-shells. Alternatively, the ionomer composition can be placed into a compression mold and molded under sufficient pressure, temperature, and time to produce the hemispherical shells. The smooth-surfaced hemispherical shells are then placed around the ball subassembly in a compression mold. Under sufficient heating and pressure, the shells fuse together to form an inner cover layer that surrounds the subassembly. In another method, the ionomer composition is injection-molded directly onto the core using retractable pin injection molding. An outer cover layer comprising a polyurethane or polyurea composition may be formed by using a casting process.

For example, in one version of the casting process, a liquid mixture of reactive polyurethane prepolymer and chain-extender (curing agent) is poured into lower and upper mold cavities. Then, the golf ball subassembly is lowered at a controlled speed into the reactive mixture. Ball suction cups can hold the ball subassembly in place via reduced pressure or partial vacuum. After sufficient gelling of the reactive mixture (typically about 4 to about 12 seconds), the vacuum is removed and the intermediate ball is released into the mold cavity. Then, the upper mold cavity is mated with the lower mold cavity under sufficient pressure and heat. An exothermic reaction occurs when the polyurethane prepolymer and chain extender are mixed and this continues until the cover material encapsulates and solidifies around the ball subassembly. Finally, the molded balls are cooled in the mold and removed when the molded cover is hard enough so that it can be handled without deformation.

After the golf balls have been removed from the mold, they may be subjected to finishing steps such as flash-trimming, surface-treatment, marking, coating, and the like using techniques known in the art. For example, in traditional white-colored golf balls, the white-pigmented cover may be surface-treated using a suitable method such as, for example, corona, plasma, or ultraviolet (UV) light-treatment. Then, indicia such as trademarks, symbols, logos, letters, and the like may be printed on the ball's cover using pad-printing, ink-jet printing, dye-sublimation, or other suitable printing methods. Clear surface coatings (for example, primer and top-coats), which may contain a fluorescent whitening agent, are applied to the cover. The resulting golf ball has a glossy and durable surface finish.

In another finishing process, the golf balls are painted with one or more paint coatings. For example, white primer paint may be applied first to the surface of the ball and then a white top-coat of paint may be applied over the primer. Of course, the golf ball may be painted with other colors, for example, red, blue, orange, and yellow. As noted above, markings such as trademarks and logos may be applied to the painted cover of the golf ball. Finally, a clear surface coating may be applied to the cover to provide a shiny appearance and protect any logos and other markings printed on the ball.

Figure 1:
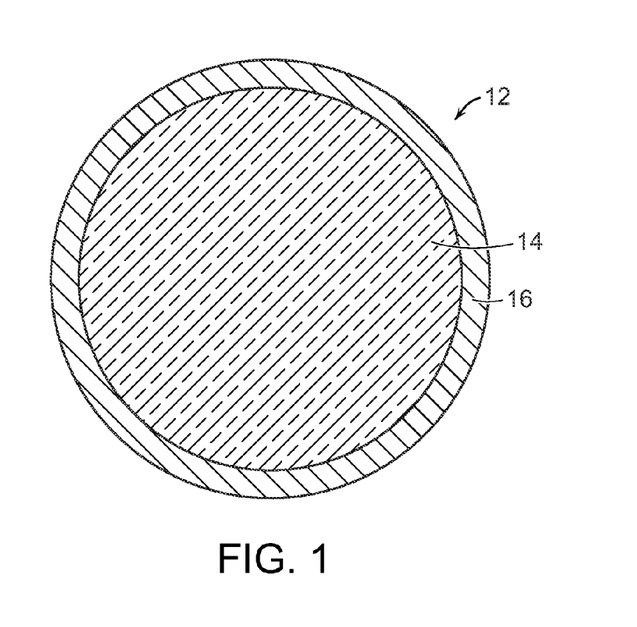
FIG. 1 is a cross-sectional view of a two-piece golf ball having a core comprising a polybutadiene blend composition made in accordance with the present invention.
Figure 2:
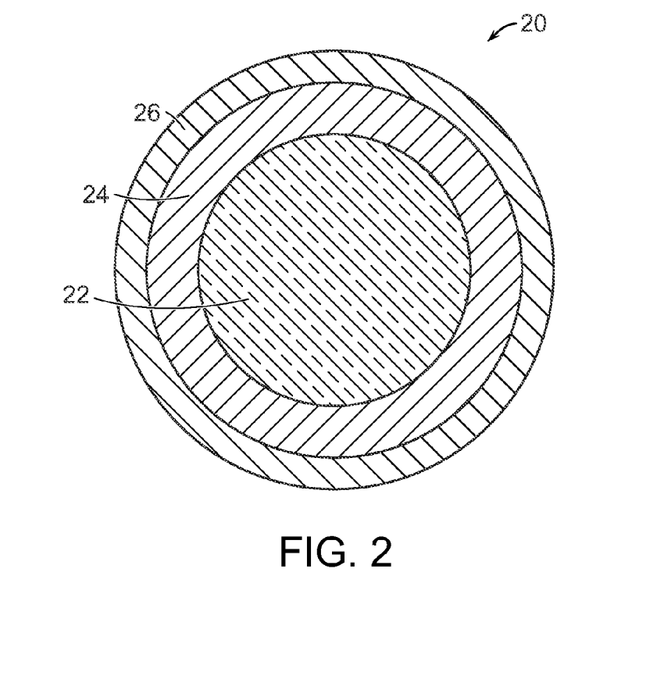
FIG. 2 is a cross-sectional view of a three-piece golf ball having a core comprising a polybutadiene blend composition made in accordance with the present invention.
Figure 3:
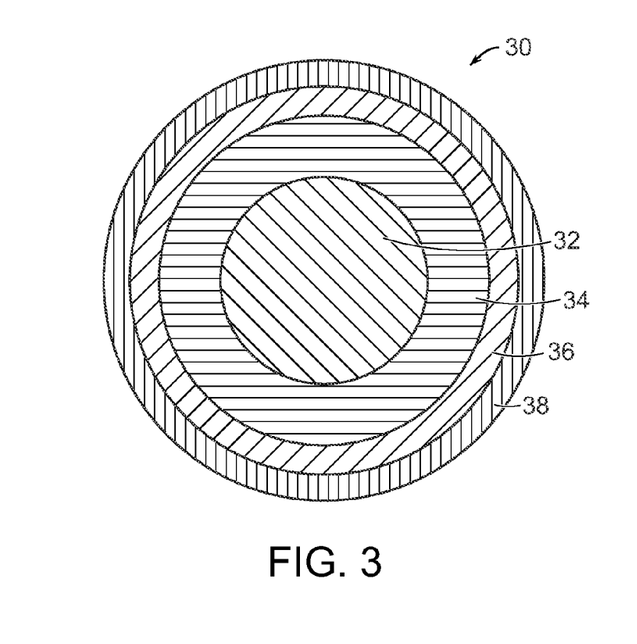
FIG. 3 is a cross-sectional view of a four-piece golf ball having a core comprising a polybutadiene blend composition made in accordance with the present invention.
Figure 4:
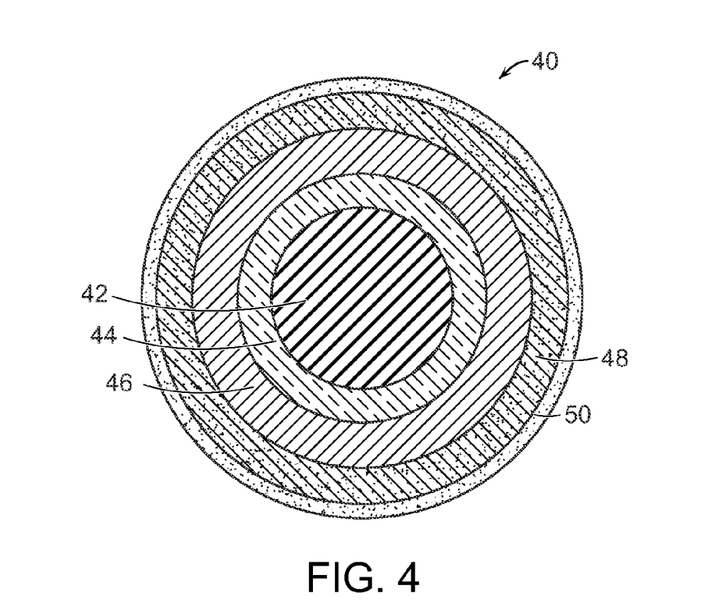
FIG. 4 is a cross-sectional view of a five-piece golf ball having a core comprising a polybutadiene blend composition made in accordance with the present invention.

Different ball constructions can be made using the polybutadiene rubber composition of this invention. Such golf ball designs include, for example, two-piece, three-piece, four-piece, and five-piece designs. Referring to FIG. 1, one version of a golf ball that can be made in accordance with this invention is generally indicated at (12). The two-piece ball (12) contains an inner core (14) and an outer cover (16). In this version, the inner core (12) is made of the polybutadiene rubber blend of this invention. In FIG. 2, a three-piece golf ball (20) is shown. The ball (20) contains a dual-core consisting of inner core (22) and outer core layer (24). In one preferred version, the inner core (22) is made of the polybutadiene rubber blend as described above; and the outer core (24) is made of a composition that is substantially free of metallocene-catalyzed polybutadiene rubber. The composition of the outer core (24) preferably comprises non-metallocene catalyzed polybutadiene and other additives/fillers normally added to polybutadiene compositions as described above, but the composition does not include any metallocene-catalyzed polybutadiene. That is, in this particular version, no metallocene-catalyzed polybutadiene rubber is present in the outer core layer (24). The golf ball (20) further includes an outer cover layer (26) that encloses the dual-core (22, 24). In FIG. 3, a four-piece ball (30) having a dual-core and dual-cover is shown. More particularly, the ball (30) contains a dual-core consisting of inner core (32) and outer core layer (34). The dual-core (32, 34) preferably has the same structure and composition as described in the three-piece ball (20) of FIG. 2. The surrounding cover includes inner cover layer (36) and outer cover layer (38). Turning to FIG. 4 in yet another version, a five-piece golf ball (40) containing inner core (42); outer core layer (44); intermediate layer (46); inner cover layer (48); and outer cover layer (50) is illustrated. In FIGS. 1-4, the polybutadiene rubber blends of this invention are used to form the inner cores, and these are preferred embodiments as discussed above. However, it should be understood that the polybutadiene rubber blends comprising the non-metallocene catalyzed polybutadiene rubber and metallocene-catalyzed polybutadiene rubber also may be used to form outer core, intermediate, and/or cover layers. That is, the polybutadiene blend may be used to form any component in the golf ball per this invention. It also should be understood that the golf balls shown in FIGS. 1-4 are for illustrative purposes only and are not meant to be restrictive. Other golf ball constructions can be made in accordance with this invention.

The resulting golf balls of this invention have high quality performance properties. As discussed above, the polybutadiene rubber material used to form the core has good toughness and resiliency. The resulting ball has a relatively high coefficient of restitution (COR) allowing it to reach high velocity when struck by a golf club. Thus, the ball tends to travel a greater distance which is particularly important for driver shots off the tee. At the same time, the ball has a relatively soft compression feel to it. The ball is not excessively hard and stiff. Thus, the golfer experiences a better sense of control and more natural feeling when striking the ball. In general, the cores of this invention typically have a COR of about 0.75 or greater; and preferably about 0.80 or greater. Meanwhile, the compression of the core is preferably within the range of about 30 to about 100, more preferably within the range of about 70 to about 90.

The golf balls of this invention may have hardness gradients in the components making up the ball and across the finished ball. For example, in one preferred version, the core is a single-layer constituting a solid core having a "positive" hardness gradient (that is, the outer surface of the core is harder than its geometric center.) In a second preferred embodiment, the core is a dual-core comprising an inner core and a surrounding outer core layer. For example, the inner core may have a positive hardness gradient and the outer core layer also may have a positive hardness gradient. In another example, the inner core has a "positive" hardness gradient and the outer core layer has a "negative" hardness gradient (that is, the outer surface of the outer core layer is softer than the inner surface of the outer core layer.) Other embodiments of golf balls having various combinations of positive, negative, and zero hardness gradients may be made in accordance with this invention. In another example, the inner core may have a positive hardness gradient and the outer core layer may have a "zero" hardness gradient. (That is, the hardness values of the outer surface of the outer core layer and the inner surface of the outer core layer are substantially the same.) Particularly, the term, "zero hardness gradient" as used herein, means a surface to center Shore C hardness gradient of less than 8, preferably less than 5 and most preferably less than 3 and may have a value of zero or negative 1 to negative 25. The term, "negative hardness gradient" as used herein, means a surface to center Shore C hardness gradient of less than zero. The terms, zero hardness gradient and negative hardness gradient, may be used herein interchangeably to refer to hardness gradients of negative 1 to negative 25. The term, "positive hardness gradient" as used herein, means a surface to center Shore C hardness gradient of 8 or greater, preferably 10 or greater, and most preferably 20 or greater. By the term, "steep positive hardness gradient" as used herein, it is meant surface to center Shore C hardness gradient of 20 or greater, more preferably 25 or greater, and most preferably 30 or greater. For example, the core may have a steep positive hardness gradient of 35, 40, or 45 Shore C or greater. Methods for measuring the hardness of the inner core and surrounding layers and determining the hardness gradients are discussed in further detail below.

In one embodiment, the golf ball has a single-core and a single-cover layer. When a single-layered core is used, the core preferably has a diameter within a range having a lower limit of 1.40 or 1.45 or 1.50 or 1.51 or 1.53 inches and an upper limit of 1.55 or 1.59 or 1.60 or 1.62 or 1.66 inches, and more preferably has a diameter within a range having a lower limit of 1.51 or 1.53 inches and an upper range of 1.55 or 1.59 inches. In a particularly preferred embodiment, the core has a diameter of about 1.53 inches.

In another embodiment, the golf ball is a three-piece ball having an inner core; intermediate layer; and outer cover layer. In another version a four-piece ball having a dual-core (that is, a two-layered core) and a dual (two-layered) cover may be made. In yet another version, a five-piece golf ball having a dual core, an intermediate layer, and a dual cover may be made. The dual-core constitutes an inner core (center) and an outer core layer. The inner core has a diameter within a range having a lower limit of 0.75 or 0.85 or 0.875 inches and an upper limit of 1.125 or 1.15 or 1.39 inches. The outer core layer encloses the inner core such that the two-layer core has an overall diameter within a range having a lower limit of 1.40 or 1.50 or 1.51 or 1.52 or 1.525 inches and an upper limit of 1.54 or 1.55 or 1.555 or 1.56 or 1.59 inches.

When a single-layered core is used, the core preferably has a center hardness within a range having a lower limit of 30 or 40 or 45 Shore C and an upper limit of 70 or 75 or 80 Shore C. The surface hardness of the core is preferably greater than 70 Shore C, or 75 Shore C or greater, 80 Shore C or greater, 85 Shore C or greater, or 90 Shore C or greater. In a particular embodiment, the surface hardness of the core is greater than the center hardness of the core to define a positive hardness gradient and more preferably the surface hardness of the core is at least 10 Shore C units greater than the center hardness of the core.

When a dual-layered core is used, the inner core (center) preferably has a geometric center hardness within a range having a lower limit of 50 or 55 or 60 Shore C and an upper limit of 65 or 70 or 80 Shore C. Meanwhile, the outer core layer preferably has an outer surface hardness of 75 Shore C or greater, or 80 Shore C or greater, or 85 Shore C or greater, or 90 Shore C or greater. And, the inner surface of the outer core preferably has a surface hardness within a range having a lower limit of 55, 60, 65, 70, or 75 Shore C and an upper limit of 80, 85, or 90 Shore C.

The intermediate (or inner cover) layer preferably has a material hardness within a range having a lower limit of 70 or 75 or 80 or 82 Shore C and an upper limit of 85 or 86 or 90 or 92 Shore C. The thickness of the intermediate layer is preferably within a range having a lower limit of 0.010 or 0.015 or 0.020 or 0.030 inches and an upper limit of 0.035 or 0.045 or 0.080 or 0.120 inches. The outer cover layer preferably has a material hardness of 85 Shore C or less. The thickness of the outer cover layer is preferably within a range having a lower limit of 0.010 or 0.015 or 0.025 inches and an upper limit of 0.035 or 0.040 or 0.055 or 0.080 inches. Methods for measuring hardness of the layers in the golf ball are described in further detail below.

As discussed above, the single-layered core of this invention may be enclosed with one or more cover layers. The inner cover layer(s) may be referred to as intermediate layers. In one embodiment, a multi-layered cover comprising inner and outer cover layers is formed, where the inner cover layer has a thickness of about 0.01 inches to about 0.06 inches, more preferably about 0.015 inches to about 0.040 inches, and most preferably about 0.02 inches to about 0.035 inches. In this version, the inner cover layer is formed from a partially- or fully-neutralized ionomer having a Shore D hardness of greater than about 55, more preferably greater than about 60, and most preferably greater than about 65. The outer cover layer, in this embodiment, preferably has a thickness of about 0.015 inches to about 0.055 inches, more preferably about 0.02 inches to about 0.04 inches, and most preferably about 0.025 inches to about 0.035 inches, with a hardness of about Shore D 80 or less, more preferably 70 or less, and most preferably about 60 or less. The inner cover layer is harder than the outer cover layer in this version. A preferred outer cover layer is a castable or reaction injection molded polyurethane, polyurea or copolymer, blend, or hybrid thereof having a Shore D hardness of about 40 to about 50. In another multi-layer cover, single core embodiment, the outer cover and inner cover layer materials and thickness are the same but, the hardness range is reversed, that is, the outer cover layer is harder than the inner cover layer.

The outer core layer may be formed from any suitable thermosetting or thermoplastic materials such as, for example, polyurethane, polyurea, partially or fully neutralized ionomers, thermosetting polydiene rubber such as polybutadiene, polyisoprene, ethylene propylene diene monomer rubber, ethylene propylene rubber, natural rubber, balata, butyl rubber, halobutyl rubber, styrene butadiene rubber or any styrenic block copolymer such as styrene ethylene butadiene styrene rubber, and the like, metallocene or other single-site catalyzed polyolefin, polyurethane copolymers, for example, with silicone. In one embodiment, the outer core is formed from a "second rubber composition" comprising a natural or synthetic rubber such as, for example, polybutadiene, polyisoprene, ethylene propylene rubber ("EPR"), styrene-butadiene rubber, styrenic block copolymer rubbers (such as "SI", "SIS", "SB", "SBS", "SIBS", and the like, where "S" is styrene, "I" is isobutylene, and "B" is butadiene), butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof. The polybutadiene rubber compositions of this invention comprising the non-metallocene and metallocene-catalyzed polybutadiene also may be used to form the outer core layer.

Both the inner core and outer core layer may have a positive hardness gradient as described above. Alternatively, the inner core and outer core layer each may have a zero or negative hardness gradient. For example, the surface of the outer core layer ("second outer surface") and inner surface of the core layer ("first outer surface") each may have a hardness, the hardness of the second outer surface being in the range of 50 to 85 Shore C units and the hardness of the inner outer surface being in the range of 51 to 86 Shore C units, so that the hardness of the second outer surface is the same or less than the hardness of the first outer surface to define a zero or negative hardness gradient. In another example, the hardness of the second outer surface is in the range of 55 to 95 Shore C units and the hardness of the first outer surface is in the range of 51 to 86 Shore C units, so that the hardness of the second outer surface is greater than the hardness of the first outer surface to define a positive hardness gradient. It should be understood that the inner core and outer core layers may have any combination of positive, negative, and zero hardness gradients.

In one version, the golf ball includes a multi-layered cover comprising inner and outer cover layers. The inner cover layer is preferably formed from a composition comprising an ionomer or a blend of two or more ionomers that helps impart hardness to the ball. In a particular embodiment, the inner cover layer is formed from a composition comprising a high acid ionomer. A particularly suitable high acid ionomer is Surlyn 8150® (DuPont). Surlyn 8150® is a copolymer of ethylene and methacrylic acid, having an acid content of 19 wt %, which is 45% neutralized with sodium. In another particular embodiment, the inner cover layer is formed from a composition comprising a high acid ionomer and a maleic anhydride-grafted non-ionomeric polymer. A particularly suitable maleic anhydride-grafted polymer is Fusabond 525D® (DuPont). Fusabond 525D® is a maleic anhydride-grafted, metallocene-catalyzed ethylene-butene copolymer having about 0.9 wt % maleic anhydride grafted onto the copolymer. A particularly preferred blend of high acid ionomer and maleic anhydride-grafted polymer is a 84 wt %/16 wt % blend of Surlyn 8150® and Fusabond 525D®. Blends of high acid ionomers with maleic anhydride-grafted polymers are further disclosed, for example, in U.S. Pat. Nos. 6,992,135 and 6,677,401, the entire disclosures of which are hereby incorporated herein by reference.

In one embodiment, the inner cover layer is formed from a composition comprising a 50/45/5 blend of Surlyn® 8940/Surlyn® 9650/Nucrel® 960, and, in a particularly preferred embodiment, the composition has a material hardness of from 80 to 85 Shore C. In another embodiment, the inner cover layer is formed from a composition comprising a 50/25/25 blend of Surlyn® 8940/Surlyn® 9650/Surlyn® 9910, preferably having a material hardness of about 90 Shore C. The inner cover layer also may be formed from a composition comprising a 50/50 blend of Surlyn® 8940/Surlyn® 9650, preferably having a material hardness of about 86 Shore C. In yet another embodiment, a composition comprising a 50/50 blend of Surlyn® 8940 and Surlyn® 7940 is used. Surlyn® 8940 is an E/MAA copolymer in which the MAA acid groups have been partially neutralized with sodium ions. Surlyn® 9650 and Surlyn® 9910 are two different grades of E/MAA copolymer in which the MAA acid groups have been partially neutralized with zinc ions. Nucrel® 960 is an E/MAA copolymer resin nominally made with 15 wt % methacrylic acid.

A wide variety of materials may be used for forming the outer cover including, for example, polyurethanes; polyureas; copolymers, blends and hybrids of polyurethane and polyurea; olefin-based copolymer ionomer resins (for example, Surlyn® ionomer resins and DuPont HPF® 1000 and HPF® 2000, commercially available from DuPont; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from DuPont; polyurethane-based thermoplastic elastomers, such as Elastollan®, commercially available from BASF; synthetic or natural vulcanized rubber; and combinations thereof. Castable polyurethanes, polyureas, and hybrids of polyurethanes-polyureas are particularly desirable because these materials can be used to make a golf ball having high resiliency and a soft feel. By the term, "hybrids of polyurethane and polyurea," it is meant to include copolymers and blends thereof.

Polyurethanes, polyureas, and blends, copolymers, and hybrids of polyurethane/polyurea are also particularly suitable for forming cover layers. When used as cover layer materials, polyurethanes and polyureas can be thermoset or thermoplastic. Thermoset materials can be formed into golf ball layers by conventional casting or reaction injection molding techniques. Thermoplastic materials can be formed into golf ball layers by conventional compression or injection molding techniques.

The inner cover layer preferably has a material hardness within a range having a lower limit of 70 or 75 or 80 or 82 Shore C and an upper limit of 85 or 86 or 90 or 92 Shore C. The thickness of the intermediate layer is preferably within a range having a lower limit of 0.010 or 0.015 or 0.020 or 0.030 inches and an upper limit of 0.035 or 0.045 or 0.080 or 0.120 inches. The outer cover layer preferably has a material hardness of 85 Shore C or less. The thickness of the outer cover layer is preferably within a range having a lower limit of 0.010 or 0.015 or 0.025 inches and an upper limit of 0.035 or 0.040 or 0.055 or 0.080 inches. Methods for measuring hardness of the layers in the golf ball are described in further detail below.

As discussed above, the core made from the polybutadiene rubber composition of this invention may be enclosed with one or more cover layers. In one embodiment, a multi-layered cover comprising inner and outer cover layers is formed, where the inner cover layer has a thickness of about 0.01 inches to about 0.06 inches, more preferably about 0.015 inches to about 0.040 inches, and most preferably about 0.02 inches to about 0.035 inches. In this version, the inner cover layer is formed from a partially- or fully-neutralized ionomer having a Shore D hardness of greater than about 55, more preferably greater than about 60, and most preferably greater than about 65. The outer cover layer, in this embodiment, preferably has a thickness of about 0.015 inches to about 0.055 inches, more preferably about 0.02 inches to about 0.04 inches, and most preferably about 0.025 inches to about 0.035 inches, with a hardness of about Shore D 80 or less, more preferably 70 or less, and most preferably about 60 or less. The inner cover layer is harder than the outer cover layer in this version. A preferred outer cover layer is a castable or reaction injection molded polyurethane, polyurea or copolymer, blend, or hybrid thereof having a Shore D hardness of about 40 to about 50. In another multi-layer cover, dual-core embodiment, the outer cover and inner cover layer materials and thickness are the same but, the hardness range is reversed, that is, the outer cover layer is harder than the inner cover layer.

Test Methods

Hardness.

The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball subassembly is centered under the durometer indenter before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conforms to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost portion of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer, if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used.

Also, it should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore C or Shore D hardness) was measured according to the test method ASTM D-2240.

Compression.

As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, "compression" refers to Atti compression and is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Very low stiffness cores will not cause the spring to deflect by more than 1.25 mm and therefore have a zero compression measurement. The Atti compression tester is designed to measure objects having a diameter of 42.7 mm (1.68 inches); thus, smaller objects, such as golf ball cores, must be shimmed to a total height of 42.7 mm to obtain an accurate reading. Conversion from Atti compression to Riehle (cores), Riehle (balls), 100 kg deflection, 130-10 kg deflection or effective modulus can be carried out according to the formulas given in J. Dalton. Compression may be measured as described in McNamara et al., U.S. Pat. No. 7,777,871, the disclosure of which is hereby incorporated by reference.

Coefficient of Restitution ("COR").

The COR is determined according to a known procedure, wherein a golf ball or golf ball subassembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The COR is then calculated as the ratio of the ball's outgoing transit time period to the ball's incoming transit time period ($COR=V_{out}/V_{in}=T_{in}/T_{out}$).

Examples

The following prophetic Examples describe different polybutadiene rubber compositions containing varying concentrations of metallocene-catalyzed polybutadiene rubber. As described in these Examples, compositions containing 100% metallocene-catalyzed polybutadiene rubber have poor processability. However, compositions containing blends of metallocene-catalyzed polybutadiene and non-metallocene catalyzed polybutadiene have effective processability.

| Ingredient | Ex. 1 | Ex. 2 | Ex. 3 | Ex. 4 |
|---|---|---|---|---|
| Metallocene-BR | 100 | 50 | 55 | 45 |
| CB23 | — | 50 | — | — |
| BR1220 | — | — | 45 | — |
| Budene 1208 | — | — | — | 55 |
| SR526 | 32 | 35 | 29 | 31 |
| Perkadox BC | 0.5 | 0.5 | 0.5 | — |
| Trigonox 265 | — | — | — | 1.2 |
| MBPC | — | — | — | 0.5 |
| ZnO | 5 | 5 | 5 | 5 |
| BaSO4 | 12.5 | 12.5 | 12.5 | 12.5 |
| ZnPCTP | — | — | 0.50 | — |
| Color | 0.1 | 0.1 | 0.1 | 0.1 |
| Processing | Poor | Good | Very Good | Very Good |
| Atti Compression | N/A | 88 | 70 | 76 |
| CoR | N/A | 0.815 | 0.804 | 0.798 |

Buna ®CB 23—non-metallocene catalyzed polybutadiene rubber having a Mooney viscosity of 52, available from Lanxess Corp.
Buna ®CB 1220—non-metallocene catalyzed polybutadiene rubber having a Mooney viscosity of 40, available from Lanxess Corp.

-continued

| Ingredient | Ex. 1 | Ex. 2 | Ex. 3 | Ex. 4 |
|---|---|---|---|---|

Budene ® 1207—non-metallocene catalyzed polybutadiene rubber having a Mooney viscosity of 45, available from Goodyear, Inc.
Dymalink ® 256—zinc diacrylate, available from Cray Valley.
Perkadox ® BC—dicumyl peroxide granules, available from Akzo Nobel NV.
Trigonox ®265—peroxide free-radical initiator, available from Akzo Nobel NV.
MBPC—2,2'-methylene bis 4-methyl-6-tert-butyl-phenol (antioxidant)
ZnO—zinc oxide
BaSO$_4$—barium sulfate
ZnPCTP—zinc pentachlorothiophenol, available from Strukol Company and eChinaChem, Inc.
Color—color pigment.

In one preferred version, the metallocene-catalyzed polybutadiene has various properties including a Solution Viscosity in the range of about 90 to about 120 (units are cP or mPa·S-5 Wt % solution in toluene at 25° C. using Cannon-Fenske tubes). In addition, the polydispersity (Mw/Mn) of the metallocene-catalyzed polybutadiene is preferably in the range of about 1.75 to about 2.5. Preferably, the absolute molecular weight of the metallocene-catalyzed polybutadiene is in the range of about 225,000 to about 325,000 (as measured by dissolving an appropriate amount of polybutadiene in THF and chromatographing the solution using 2 Jordi Gel DVB Mixed Bed LS columns, with triple detection (refractive index, viscometry and right angle laser light scattering) and using a do/dc of 0.130, all at 30° C.). Also, the metallocene-catalyzed polybutadiene preferably has a resilience index of about 80 to about 120 (as measured according to test procedures in Wu et al., U.S. Pat. No. 6,818,705). Furthermore, the metallocene-catalyzed polybutadiene preferably has a cis-content of about 80 to 90%, a trans-content of about 1 to about 10%, a vinyl-content of about 5 to about 15%, and a Mooney viscosity of about 30 to about 50.

When numerical lower limits and numerical upper limits are set forth herein, it is contemplated that any combination of these values may be used. Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention.

All patents, publications, test procedures, and other references cited herein, including priority documents, are fully incorporated by reference to the extent such disclosure is not inconsistent with this invention and for all jurisdictions in which such incorporation is permitted.

It is understood that the compositions and golf ball products described and illustrated herein represent only some embodiments of the invention. It is appreciated by those skilled in the art that various changes and additions can be made to compositions and products without departing from the spirit and scope of this invention. It is intended that all such embodiments be covered by the appended claims.

We claim:
1. A golf ball, comprising:
a) an inner core comprising a cured rubber mixture of about 50 to about 95% by weight of a non-metallocene catalyzed polybutadiene rubber and about 5 to about 50% by weight metallocene-catalyzed polybutadiene rubber, wherein the center of the inner core and outer surface of the inner core layer each has a hardness and die outer surface hardness of the inner core is greater than the center hardness of the inner core, and wherein the non-metallocene catalyzed rubber has a first Mooney viscosity and the metallocene-catalyzed polybutadiene rubber has a second Mooney viscosity, the second Mooney viscosity being greater than the first Mooney viscosity, the cured rubber mixture being prepared by adding cured non-metallocene-catalyzed polybutadiene rubber to non-cured metallocene-catalyzed polybutadiene rubber and curing the mixture; and
b) a cover having at least one layer disposed about the core.

2. The golf ball of claim 1, wherein the non-metallocene catalyzed polybutadiene rubber is formed from a catalyst selected from the group consisting of neodymium, nickel, cobalt, titanium, aluminum, boron, and alkylithium based catalysts, and combinations thereof.

3. The golf ball of claim 1, wherein the metallocene catalyzed polybutadiene rubber is formed from a catalyst selected from the group consisting of ferrocene, cobaltocene, nickelocene, titanocene dichloride, zirconocene dichloride, vanadiumocene, gadolinocene, and samraocene based catalysts, and combinations thereof.

4. The golf ball of claim 1, wherein the center hardness of the inner core is in the range of about 45 to about 80 Shore C and the outer surface hardness of the inner core is greater than the center hardness of the inner core.

5. The golf ball of claim 1, wherein the outer surface hardness of the inner core as at least 10 Shore C units greater than the center hardness of the inner core.

6. The golf ball of claim 1, wherein the inner core has a diameter in the range of about 0.125 to about 1.50 inches.

7. The golf ball of claim 1, wherein the core has a compression in the range of about 30 to about 100.

8. The golf ball of claim 1, wherein the cover is a single layer having a thickness of about 0.015 to about 0.090 inches and is formed from a thermoplastic or thermoset material.

9. The golf ball of claim 1, wherein the cover comprises an inner cover layer and outer cover layer, the cover having an overall thickness of about 0.020 to about 0.070 inches and each cover layer being formed from a thermoplastic or thermoset material.

10. The golf ball of claim 9, wherein the inner cover layer comprises an ethylene acid copolymer ionomer having acid groups, wherein at least 30% of the acid groups are neutralized, and the outer cover comprises a polyurethane, polyurea, or copolymer or blend thereof.

11. The golf ball of claim 10, wherein the inner cover layer has a material hardness of 60 Shore D or greater; and the outer cover layer has a material hardness of 60 Shore D or less.

12. The golf ball of claim 1, wherein the inner core further comprises an elastomer selected from the group consisting of elastomer selected from the group consisting of ethylene-propylene rubber, polyisoprene, styrene-butadiene rubber, polyalkenamers, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and mixtures thereof.

13. The golf ball of claim 1, wherein the non metallocene catalyzed polybutadiene rubber has a Mooney viscosity in the range of 30 to 75; and the metallocene catalyzed polybutadiene rubber has a Mooney viscosity in the range of 40 to 130.

* * * * *